United States Patent [19]

Arseneault

[11] 3,840,894

[45] Oct. 8, 1974

[54] WIDE ROTOR FOR STABLE SUPPORT OF TAPE ALONG PATH OF TRANSDUCER CARRIED BY ROTOR

[75] Inventor: Paul J. Arseneault, Longmont, Colo.

[73] Assignee: International Business Machines Corporation, Armonk, N.Y.

[22] Filed: Apr. 2, 1973

[21] Appl. No.: 347,089

[52] U.S. Cl. ..................... 360/84, 360/102, 360/107

[51] Int. Cl. ......................... G11b 5/60, G11b 21/04

[58] Field of Search ................ 179/100.2 T, 100.2 P

[56] References Cited

UNITED STATES PATENTS

| | | | |
|---|---|---|---|
| 3,247,329 | 4/1966 | Tomita et al. | 179/100.2 T |
| 3,352,977 | 11/1967 | Shasmoua | 179/100.2 T |

FOREIGN PATENTS OR APPLICATIONS

| | | | |
|---|---|---|---|
| 833,278 | 4/1960 | Great Britain | 179/100.2 T |

*Primary Examiner*—Bernard Konick
*Assistant Examiner*—Robert S. Tupper
*Attorney, Agent, or Firm*—Homer L. Knearl

[57] ABSTRACT

In rotating-head magnetic recording, the rotor carrying the magnetic transducer is enlarged in width so that the width of the rotor is much greater than the track width of the head. The rotor is mounted in the middle of an air bearing mandrel around which magnetic tape is wrapped. The wide rotor also provides an air bearing for the tape. The air bearing for the rotor and mandrel is accomplished by forcing air through their cylindrical surfaces. These cylindrical surfaces may be either a porous material or a nonporous material with holes through which the air may flow. The wide air bearing rotor provides a very stable platform upon which the magnetic tape may rest while it is scanned by the rotating head.

9 Claims, 3 Drawing Figures

WIDE ROTOR FOR STABLE SUPPORT OF TAPE ALONG PATH OF TRANSDUCER CARRIED BY ROTOR

FIELD OF THE INVENTION

This invention relates to recording on magnetic tape with a rotating magnetic transducer. More particularly, the invention relates to providing an air bearing to support the tape in a stable manner along the path of the rotating head. The stability of the air bearing near the path of the rotating head becomes more critical when the rotating head is a flying head rather than a contact head. Any fluttering of the tape due to an unstable air bearing makes it almost impossible to control the flying height or separation between a rotating head and the magnetic tape.

HISTORY OF THE ART

Rotating-head magnetic recording is usually accomplished by wrapping the tape helically about a mandrel split and separated to accommodate a rotating wheel which carries the magnetic head. In other words, the mandrel consists of two separate cylindrical halves which abut a rotating wheel of the same radius as the cylindrical halves, and this rotating wheel carries the magnetic head. In many applications the magnetic tape makes contact with both the mandrel surface and the rotating wheel carrying the magnetic head.

Alternatively, to reduce wear, the mandrel halves have been made air bearing to support the tape as it is wrapped helically about the mandrel. The air bearing support has been achieved hydrostatically and hydrodynamically. With a hydrostatic air bearing the mandrel halves contain holes through which air is forced to provide the air bearing between tape and mandrel. With a hydrodynamic air bearing, the mandrel itself is rotated and the rotating action creates a hydrodynamic air bearing to separate the tape from the mandrel. To date, in both cases, the magnetic head still makes contact with the tape and does not fly relative to the tape.

An example of the hydrostatic air bearing mandrel is shown in Shashoua et al, U.S. Pat. No. 3,488,455. In this patent the air bearing is achieved via holes in the mandrel through which air is forced. The rotary wheel or rotor upon which the head is mounted produces its own hydrodynamic air bearing based upon the availability of air from the mandrel and the speed of rotation of the wheel. The head itself contacts the tape as the wheel rotates. Thus, since the head is not flying, the problem of controlling head to tape separation does not exist.

An example of the hydrodynamic air bearing is shown in the J. H. Streets patent, U.S. Pat. No. 3,333,753. In this patent the air bearing is created by rotating one-half of the mandrel and mounting the head on the rotating half of the mandrel. The rotating mandrel half creates an hydrodynamic air bearing for itself and a "squeeze air bearing" for the stationary half of the mandrel as discussed in the patent. The magnetic head in this Streets patent also makes contact with the magnetic tape. Therefore, the Streets patent does not have the problem of careful control of tape support to assist in controlling head to tape separation while flying a magnetic head relative to the tape.

As can be seen from the above prior art examples, the prior art has taken the approach of keeping the rotating head in contact with the magnetic tape. This technique carries enormous tape wear and head wear problems. These wear problems can be eliminated by flying the rotating head relative to the tape. One critical problem in flying the rotating head relative to the tape is the necessity of providing stable support for the tape along the path of the rotating head. As is readily apparent, any disturbance which causes a variation in the thickness or depth of an air bearing along the path of the rotating head amplifies the problem of trying to control flying height between the rotating head and the tape. Some sources of perturbations are (1) discontinuity in tape support and (2) lack of concentricity or identical diameter in the two mandrel halves located on each side of the rotor carrying the magnetic head.

With regard to concentricity, each air bearing thickness is in the order of 1–3 mils and the flying height relative to the rotating head is in the order of 50 microinches. Accordingly, a 1 mil difference in the surface position between mandrel halves, or between the mandrel and the rotor carrying the head has a catastrophic effect on flying height.

With regard to discontinuity in tape support, a change from air bearing over the mandrel to no air bearing over the rotor can cause instability in the tape along the path of the rotating head. This discontinuity may even cause the tape to crash onto the mandrel, the rotor, or the head carried by the rotor. Also a change in type of air bearing from mandrel to rotor can cause instability in the tape along the path of the rotating head. Thus, either forcing air out past the rotor in the gap between the rotor and each mandrel half, or relying on a hydrodynamic air bearing for the rotor would still create a discontinuity in the air bearing between mandrel and rotor. The discontinuity causes the tape to wobble or buckle near the path of the rotating head.

SUMMARY OF THE INVENTION

In accordance with this invention a stable platform for supporting the magnetic tape along the path of the rotating head has been achieved by providing a support for the magnetic tape which is substantially the same as the support provided the tape by the two mandrel halves on each side of the rotor carrying the magnetic head. Preferably, this support is a hydrostatic air bearing for each of the mandrel halves and also for the rotor. Of course, a hydrodynamic effect will also exist with the rotor as the rotor is in motion. In addition, the width of the rotor should be substantially greater than the width of the head carried by the rotor, so as to eliminate any perturbation in tape support caused by slight differences in diameter or concentricity between the mandrel halves and the rotor. In other words, the rotor should be designed so that it provides a stable platform for the magnetic tape along the path of the rotating head. In this way, the wobble or fluttering of the tape along the path of the rotating head will be eliminated, and flying height between the head and the tape may be more easily controlled.

The foregoing and other features and advantages of the invention will be apparent from the following more particular description of a preferred embodiment of the invention as illustrated in the accompanying drawings.

DESCRIPTION OF PREFERRED EMBODIMENT

Figure 1:
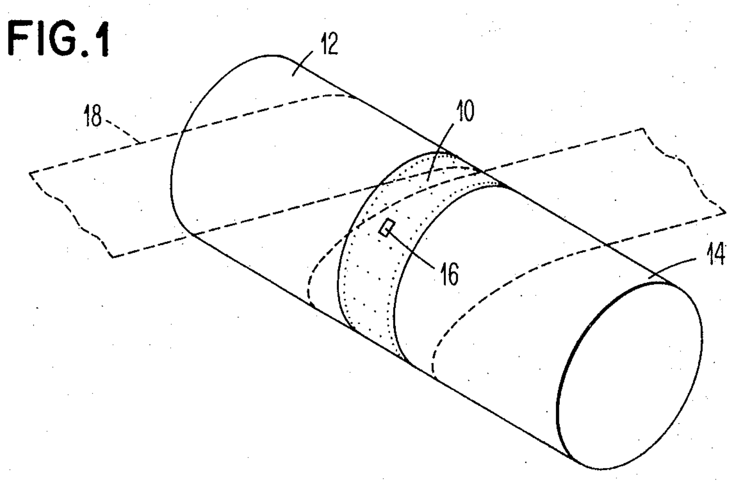
FIG. 1 shows one preferred embodiment of the invention wherein the rotor is much wider than the head, which the rotor carries, and provides an air bearing to the magnetic tape via air forced through holes in the rotor.

In FIG. 1 the pressure rotor 10 is shown mounted between the two mandrel halves 12 and 14. The rotor carries the magnetic head 16 to scan the tape 18. Tape 18 is guided in an arcuate path about the rotary path of the head by being wrapped helically about the mandrel and rotor assembly. Alternatively, the tape might be wrapped cylindrically about a portion of the mandrel and moved in the direction of the axis of the mandrel.

Rotor 10 has holes in its surface for permitting air under pressure to flow through the surface of the rotor to provide the air bearing between the rotor and the tape 18. The mandrel halves 12 and 14 are also air bearing which is achieved by forcing air through porous material making up the surface of the mandrel. Alternatively, the mandrel halves 12 and 14 could have holes in their cylindrical surfaces through which the air could be forced to form the air bearing between the mandrel and the tape 18.

FIG. 1 graphically displays that the rotor 10 is much wider than the head 16 which it carries. This extra width in the rotor, coupled with the fact that the rotor is pressurized to provide an air bearing, provides a stable platform upon which the tape 18 can rest as the rotating head scans across the tape. Stated another way, the preferred stable platform is a continuous uniform air bearing along the path of the rotating head.

Discontinuities in the transition region from mandrel half to rotor no longer affect the flying height between the rotating head and the tape, because they have been isolated from the path of the rotating head. The isolation is due to the fact that the air bearing on the pressurized rotor is substantially the same as the air bearing on the mandrel halves 12 and 14, and is also due to the width of the rotor separating the head from the discontinuity in height between rotor and mandrel halves.

Figure 2:
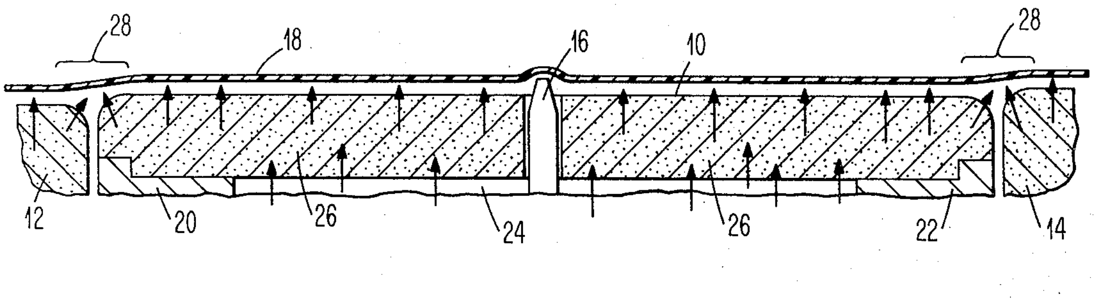
FIG. 2 is a cross-section of the surface of the air bearing rotor bounded by air bearing mandrel halves, and showing the flow of air through the rotor to provide a stable platform for the magnetic tape to ride on along the path of the rotating head.

In FIG. 2 the manner in which the invention provides a stable platform for the tape along the rotary path of the head is clearly shown. The surface of rotor 10 is shown in cross-section positioned between mandrel halves 12 and 14. Head 16 is shown mounted in the rotor 10. The position of the tape 18 is shown as it rides on an air bearing above the pressure rotor 10 and the air bearing mandrel halves 12 and 14. The same elements in FIGS. 1 and 2 have been given the same reference numeral; however, the rotor identified by reference numeral 10 in both figures is slightly different. In FIG. 1 rotor 10 has a nonporous surface with holes to supply air, while in FIG. 2 rotor 10 has a porous surface to supply air.

The magnetic head 16 is a flying head which aerodynamically creates a bulge in the tape 18 as the head 16 moves under the tape. A description of this magnetic head is in copending commonly assigned patent application Ser. No. 318,973, filed Dec. 27, 1972, entitled "Wasp-Waist Head For Flying Flexible Magnetic Storage Medium Over Head."

As indicated in FIG. 2, the surface of the mandrel halves 12 and 14 and the surface of the rotor 10 are usually at different levels due to dimensional tolerances of components. The difference in level between a rotor and a mandrel half is generally no more than 1 mil. However, the tape 18 is flying in the order of 2–3 mils above the surface of the mandrel or the rotor, and consequently, a level shift of 1 mil in the transition from mandrel to rotor puts a sizable perturbation in the level of the tape 18 above the mandrel or the rotor. This perturbation has been moved laterally away from the rotary path of the head 16 because of the width of the rotor 10. The width of the rotor 10 is not critical, except that it should be sufficient such that perturbations existing at the discontinuity between mandrel half and rotor will be damped out before they reach the path of the head 16. Stated another way, the rotor 10 has sufficient width so that a stable platform for the tape 18 exists in the immediate area of the head 16.

The air bearing in FIG. 2 is achieved by use of a porous material to form the outer surface of the mandrels 12 and 14 and the rotor 10. Rotor 10 has nonporous sidewalls 20 and 22 which define a plenum chamber 24 which is pressurized. The porous surface 26 of the rotor then surrounds the head 16 and covers the entire outside cylindrical surface of the rotor 10. Air under pressure in the plenum chamber 24 is forced into the porous material 26. The air works its way through the porous material and provides a uniform air pressure out the surface of the porous material adjacent to the tape 18.

The flow of air into and out of the porous material is depicted by the arrows in FIG. 2. Of particular interest is the fact that the corners of the rotor and of the mandrel halves are rounded and made of porous material so that the air passing out of these corners will tend to support the tape in the transition region 28 between a mandrel half and the rotor.

The surface of the mandrel halves 12 and 14 is substantially the same as the surface 26 of the rotor 10. The plenum and sidewalls for the mandrel halves 12 and 14 are not shown in the cut-away of the mandrel halves in FIG. 2. These do exist and do provide the same type of air bearing out the surface of the mandrel halves 12 and 14 just as the air bearing provides out the surface of the rotor 10. The air bearings from both the rotor and mandrel preferably have the same thickness and stiffness.

By providing a hydrostatic air bearing in both the mandrel halves and in the rotor, a continuity of air bearing or continuity of the support of the tape is provided across the mandrel and rotor. This continuity adds substantially to the stability of the tape 18 in the region of the rotary path of head 16. While the manner in which the hydrostatic bearing is achieved is not critical, it is preferable to use the same type of hydrostatic bearing in a rotor as exists in the mandrel halves. The hydrostatic bearing might be achieved by forcing air through a porous material or by forcing air through holes in a nonporous material. The important thing is that the strength of the air bearing should be substantially the same over the rotor as over the mandrel halves, so as to achieve a continuity of air bearing from mandrel half to rotor to other mandrel half.

Figure 3:
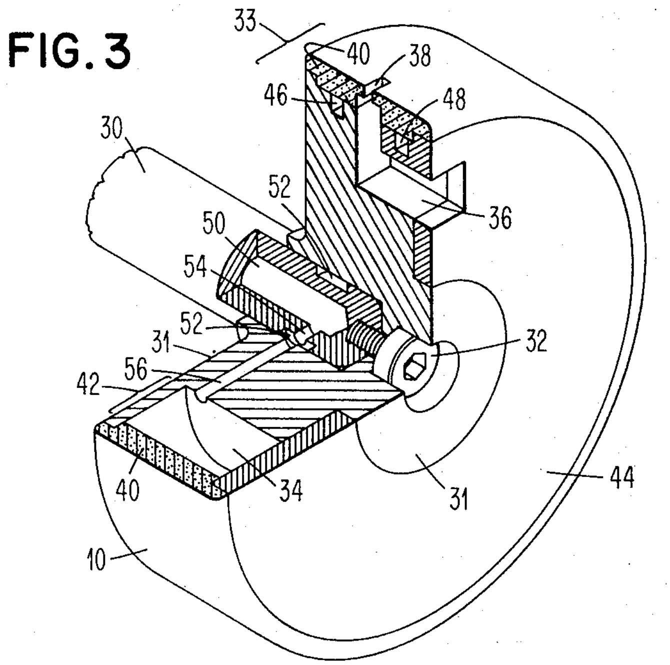
FIG. 3 shows a pressurized air-bearing rotor mounted on a shaft with a section cut away to show the construction of the rotor.

An example of the structure of the pressure rotor is shown in FIG. 3. The rotor 10 is mounted on a hollow shaft 30. The rotor has a hub 31 which is tied to the shaft via a threaded bolt 32. Inside the rotor is an annular plenum chamber 34 that goes around the entire rotor except in the region 33 where the head is to be mounted. Chamber 36 is provided for mounting a head through the hole 38 in the porous surface 40 of the rotor.

The rotor has nonporous walls 42 and 44 which support the cylindrical porous surface 40 of the rotor. The nonporous walls and hub of the rotor may be constructed of aluminum, for example. Possible choices for the porous surface of the rotor could be sintered bronze or porous ceramics.

Wall 42 is constructed as an integral part of the nonporous hub 31 making up the rotor. Also integrated into this nonporous hub 31 is the chamber 36 for mounting the magnetic head.

To provide air to the porous surface 40 immediately adjacent the hole 38 for the head, channels 46 and 48 are cut. Channel 46 is cut in the hub 31. Integral with the other wall 44 of the pressure rotor is the top of the chamber 36. In this top section of the chamber 36, the second channel 48 is cut to provide air to the porous surface 40 adjacent the head. Thus the channels 46 and 48 are provided to communicate to the plenum chamber 34 since the plenum chamber is not placed in the region 33 of the head mount. Of course, an alternate choice would be to leave the plenum chamber completely annular all around the entire pressure rotor and seal the plenum chamber after the magnetic head has been mounted in the rotor.

Air flow to the plenum chamber 34 is provided through the hollow center 50 of the shaft 30. The shaft center 50 communicates with an annular chamber 52 in the shaft through holes 54 (one shown). An annular chamber 52 communicates to the plenum chamber 34 through holes 56 drilled in the hub 31 at regularly spaced intervals around the hub. Holes 54 in the shaft between the shaft center 50 and the annular chamber 52 are also regularly spaced around the shaft. Thus air under pressure enters the hollow center 50 of the shaft 30, passes through the holes 54 in the shaft, and into the annular chamber 52 of the shaft. From there the air moves into holes 56 (one shown) in the hub 31, and finally to the plenum chamber 34 in the pressure rotor.

It will be appreciated by one skilled in the art that there are many configurations that the pressure rotor could assume, and that there is nothing critical in the structure of the rotor as shown in FIG. 3. The significance of the invention is that the rotor is much wider than the magnetic head which it carries. An additional feature is that the rotor provides a bearing for the magnetic tape similar to the bearing provided by the mandrel. As a result, a very stable platform exists to support the magnetic tape all along the entire length of the path of the rotating head.

What is claimed is:

1. Apparatus for supporting magnetic tape uniformly along the path of a rotating non-contact head for reading and writing information in tracks oriented at an acute angle relative to the direction of motion of the tape, said apparatus comprising:

wide rotor means for carrying the magnetic head in a rotary path;

means for supporting the tape with an air bearing in an arcuate path, said support means flanking both sides of said rotor means;

said rotor means having means for supporting the tape along said rotary path with an air bearing and having a width substantially greater than the track width of the head whereby perturbations in tape support are damped out as the tape moves from said support means to said rotor means before the tape reaches the rotary path of the head.

2. The apparatus of claim 1 wherein said rotor means provides the same type of air bearing support to the tape as said support means so that there is a continuity of support as said tape moves across said support means and said rotor means whereby perturbations in the tape support at transition regions between said support means and said rotor means are reduced.

3. The apparatus of claim 2 wherein the air bearing provided by both said guide means and said rotor means is substantially a hydrostatic air bearing of the same stiffness for both said support means and said rotor means.

4. In cross tape magnetic recording wherein magnetic tape is wrapped helically about a mandrel and flying magnetic head is carried on a rotor which splits the mandrel into two sections, improvements in said mandrel and rotor for providing a stable platform of support for the magnetic tape along the path of the rotating head, said improvements comprising:

the width of said rotor being substantially greater than the track width of the head carried by said rotor so that tape support in the area immediately adjacent the head is stable and uniform;

said mandrel and said rotor having means generating an air bearing of substantially the same stiffness for supporting the tape so that support of the tape will not be markedly disturbed when the tape makes transitions between mandrel and rotor.

5. The improvements of claim 4 wherein the surfaces of both said mandrel and said rotor are constructed of a nonporous material and have holes bored therein for providing substantially a hydrostatic air bearing between the tape and said mandrel and said rotor.

6. The improvements of claim 4 wherein the surface of both said mandrel and said rotor are constructed of a porous material and are pressurized with air so that air flows out of the surfaces to provide substantially a hydrostatic air bearing between the tape and both said mandrel and said rotor.

7. The improvements of claim 6 wherein the porous surfaces of said mandrel and said rotor have rounded edges of porous material where the mandrel sections are adjacent the rotor so that air is supplied in the transition region from mandrel to rotor to support the tape in the transition regions between the mandrel and the rotor.

8. Method for guiding magnetic tape through an arcuate path adjacent a non-contact rotating magnetic head in a manner to reduce perturbations in the tape relative to the path of the rotating head, said method comprising the steps of:

wrapping the tape about a mandrel and a wide rotor carrying the magnetic head so that the tape is given an arcuate path adjacent the rotary path of the head, the width of the rotor being substantially greater than the track width of the head;

supporting the tape in the region of the rotary path of the head only with the wide rotor so that perturbations in support of the tape caused by transitions between the rotor and the mandrel have no effect on support of the tape along the rotary path of the head;

generating a bearing force between the tape and both the mandrel and the rotor of substantially the same type so that there is a continuity of support of the tape across the mandrel and rotor combination.

9. The method of claim 8 wherein said generating step comprises the steps of:

generating a hydrostatic air bearing between the tape and the mandrel;

generating an air bearing substantially hydrostatic between the rotor and said tape wherein the air bearing between the rotor and the tape has substantially the same stiffness as the air bearing between the mandrel and the tape.

* * * * *

UNITED STATES PATENT OFFICE

CERTIFICATE OF CORRECTION

PATENT NO. : 3,840,894

DATED : October 8, 1974

INVENTOR(S) : Paul J. Arseneault

It is certified that error appears in the above-identified patent and that said Letters Patent are hereby corrected as shown below:

Column 6, line 23, change "guide" to --support--.

Signed and sealed this 15th day of July 1975.

(SEAL)
Attest:

RUTH C. MASON
Attesting Officer

C. MARSHALL DANN
Commissioner of Patents
and Trademarks